United States Patent

Watanabe et al.

Patent Number: 5,314,138
Date of Patent: May 24, 1994

[54] PRELOADER FOR USE IN A WEBBING RETRACTOR

[75] Inventors: Yasutaka Watanabe; Kenji Matsui; Fuminori Teraoka; Kohbun Tanaka, all of Aichi, Japan

[73] Assignee: Kabushiki Kaisha Tokai-Rika-Denki-Seisakusho, Japan

[21] Appl. No.: 789,285

[22] Filed: Nov. 8, 1991

[30] Foreign Application Priority Data

Nov. 27, 1990 [JP] Japan ................. 2-124731
Jul. 12, 1991 [JP] Japan ................. 3-054232

[51] Int. Cl.5 ............... B60R 22/46; B60R 22/42
[52] U.S. Cl. .................... 242/107.2; 280/806
[58] Field of Search ........... 242/107.2; 280/806, 280/807

[56] References Cited

U.S. PATENT DOCUMENTS 5,118,135  6/1992  Yano ................. 280/806
5,127,671  7/1992  Yano et al. ............ 280/806

FOREIGN PATENT DOCUMENTS 321960  6/1989  European Pat. Off. ...... 280/806
86/00497  7/1987  Fed. Rep. of Germany .

Primary Examiner—Daniel P. Stodola
Assistant Examiner—John Q. Nguyen
Attorney, Agent, or Firm—Sixbey, Friedman, Leedom & Ferguson

[57] ABSTRACT

A preloader for use in a webbing retractor for retracting an occupant-restraining webbing onto a webbing takeup shaft, and adapted to allow a webbing to be applied to a vehicle occupant with appropriate tightness. An engaging shaft is coaxially coupled with the takeup shaft, and a rotating drum is disposed around the engaging shaft at a fixed distance from the engaging shaft. The rotating drum is held by a plate, and a wire is tightly wound around the outer periphery of the rotating drum. A clamp member is disposed swingably in a direction in which the clamp member engages the webbing and in a direction in which the clamp member moves away therefrom. An urging member is provided for constantly urging the clamp member in a webbing-clamping direction. A trigger member is disposed between the clamp member and the plate, and holds the clamp member in spaced-apart relationship with the webbing. A driving force is imparted to the wire when the vehicle suddenly decelerates, and the wire is tightly wound around the drum, thereby allowing the rotating drum and the engaging shaft to rotate integrally in a webbing-taking-up direction. As the plate rotates with the rotating drum, the state in which the clamp member is held by the trigger member in spaced-apart relationship with the webbing is canceled. Consequently, the webbing is clamped by the clamp member, thereby preventing the tight winding of the webbing and restraining the occupant reliably.

6 Claims, 13 Drawing Sheets

5,314,138

PRELOADER FOR USE IN A WEBBING RETRACTOR

BACKGROUND OF THE INVENTION

1. Field of the Invention

The present invention relates to a preloader for use in a webbing retractor, and adapted to allow a webbing to be applied to a vehicle occupant with appropriate tightness when a vehicle suddenly decelerates.

2. Description of the Related Art

A seat belt apparatus is adapted to restrain a vehicle occupant with appropriate tightness by means of a webbing when a vehicle suddenly decelerates. If there is a large clearance between the webbing and the occupant, however, the seat belt apparatus cannot display a restraining performance sufficiently. For this reason, preloaders for allowing the webbing to be applied closely around the occupant by forcibly pulling the webbing in the direction of retraction when the vehicle suddenly decelerates, as well as webbing retractors equipped with the preloader, have been proposed.

The preloader of this type is provided with a clutch mechanism, comprised of a rotating drum, which corresponds to a takeup shaft. As a result, in a normal state of the vehicle, the preloader allows the webbing to be retracted and paid out freely without hampering the rotation of the takeup shaft. When the vehicle suddenly decelerates, however, the preloader suddenly causes the takeup shaft to rotate in a taking-up direction so as to retract the webbing immediately.

With the webbing retractor provided with such a conventional preloader, although when the vehicle suddenly decelerates, the preloader is actuated and forcibly pulls the webbing in the taking-up direction so as to apply the webbing closely around the occupant, there has been a drawback in that if a large webbing-drawing-out force acts after the webbing has been temporarily taken up (after the actuation of the preloader), the webbing is drawn out due to the so-called tight winding of the webbing in the same way as a conventional webbing retractor.

To overcome this drawback, it is conceivable to provide the preloader with a clamp member for locking the webbing so as to prevent the tight winding of the webbing. In a mechanism for preventing the tight winding of the webbing, it is necessary to provide a trigger means between a clutch mechanism and a clamp member in such a manner that the webbing is set in a state in which it is not clamped by the clamp member at normal times, while the webbing is set in a locked state by the clamp member when the vehicle suddenly decelerates. In this case, in the fabrication of the preloader, it is desired that a measure be devised so as to make it possible to render the requirement for the dimensional accuracy of the trigger means less stringent.

SUMMARY OF THE INVENTION

Accordingly, it is a primary object of the present invention to provide a preloader capable of reliably restraining a vehicle occupant not only by forcibly pulling a webbing in a taking-up direction at the time of a sudden deceleration of the vehicle to allow the webbing to be closely applied to the occupant, but also by preventing the subsequent tight winding of the webbing, thereby overcoming the above-described drawback of the conventional art.

To this end, the preloader in accordance with the present invention is used in a webbing retractor for forcibly retracting an occupant-restraining webbing onto a webbing takeup shaft. A frame rotatably holds the webbing takeup shaft, an engaging shaft is coupled with the webbing takeup shaft, and a clutch means is disposed in spaced-apart relationship with the engaging shaft in such a manner as to be capable of engaging the engaging shaft. A clamp means is disposed in correspondence with the webbing drawn out of the webbing takeup shaft in such a manner as to be swingable in a direction in which the clamp means engages the webbing and in a direction in which it moves away from the webbing. In an engaged state, the clamp means clamps the webbing drawn out of the takeup shaft so as to prevent the webbing from being drawn out. An urging means constantly urges the clamp means in a webbing-clamping direction. A trigger means is provided between the clutch means and the clamp means and holds the clamp means at a distance from the webbing. A driving means causes the clutch means to engage the engaging shaft, causes the webbing takeup shaft to rotate via the engaging shaft, and permits the movement of the clamp means in the webbing-clamping direction via the trigger means.

In accordance with this aspect of the invention having the above-described arrangement, in a normal state of the vehicle, the clutch means is separated from the takeup shaft so that the clutch means is rotatable. For this reason, the occupant-restraining webbing can be freely taken up or pulled out. When the vehicle reaches the state of a sudden deceleration of the vehicle, the driving means forcibly causes the clutch means to engage the takeup shaft as a unit, and rotates the clutch means in the webbing-taking-up direction. Consequently, the takeup shaft is rotated in the webbing-taking-up direction integrally with the clutch means, so that the webbing is forcibly pulled in the taking-up direction and is applied closely around the occupant. At the same time, in conjunction with the rotation of the clutch means, the trigger means cancels the holding of the clamp means. Hence, the clamp means is moved in the webbing-clamping direction by the urging means, and clamps the webbing, thereby preventing the webbing from being drawn out of the takeup shaft. Accordingly, the subsequent tight winding of the webbing is prevented, thereby allowing the webbing to restrain the occupant reliably.

Furthermore, a second object of the present invention is to provide a preloader which makes it possible to alleviate the requirement for the positional accuracy of the trigger means.

To attain this second object, a frame rotatably holds a webbing takeup shaft, an engaging shaft is coupled with the webbing takeup shaft, and a first member of a clutch means is disposed in spaced-apart relationship with the engaging shaft in such a manner as to be capable of engaging the engaging shaft. A second member of the clutch means is supported by the frame, is engaged with the first member of the clutch means, and holds the first member of the clutch means at a position spaced apart from the engaging shaft. In correspondence with the webbing drawn out of the webbing takeup shaft, a clamp means is disposed swingably in the direction in which it engages the webbing and in the direction in which it moves away from the same. In an engaged state, the clamp means clamps the webbing drawn out of the takeup shaft, thereby preventing the drawing out of the webbing. An urging means constantly urges the clamp means in the webbing-clamping direction. A trigger means is disposed between the clutch means and the clamp means, and is disposed in spaced-apart relationship with the clutch means in such a manner as to be capable of abutting against the clutch means at the time of the movement of the clutch means. In addition, the trigger means holds the clamp means in spaced-apart relationship with the webbing, and permits the movement of the clamp means in the webbing-clamping direction when the vehicle suddenly decelerates. When the vehicle suddenly decelerates, a driving means causes the clutch means to engage the engaging shaft, rotates the webbing takeup shaft via the engaging shaft, and actuates the trigger means via the clutch means.

In accordance with this aspect of the invention having the above-described arrangement, if the trigger means and the clutch means are made to engage each other at normal times, high dimensional accuracy is required. However, the clamp means is held in spaced-apart relationship with the webbing by virtue of the trigger means spaced apart from the clutch means. That is, since the clamp means can be held at a distance from the webbing without the trigger means being engaged with the clutch means, there is no need to take into consideration the engagement between the trigger means and the clutch means, so that the requirement for the positional accuracy of the trigger means can be alleviated. In addition, since the clutch means and the trigger means are separated from each other, the assembly thereof can be facilitated.

The above and other objects, features and advantages of the present invention will become more apparent from the following description of the invention when read in conjunction with the accompanying drawings.

DESCRIPTION OF THE PREFERRED EMBODIMENTS

Figure 1:
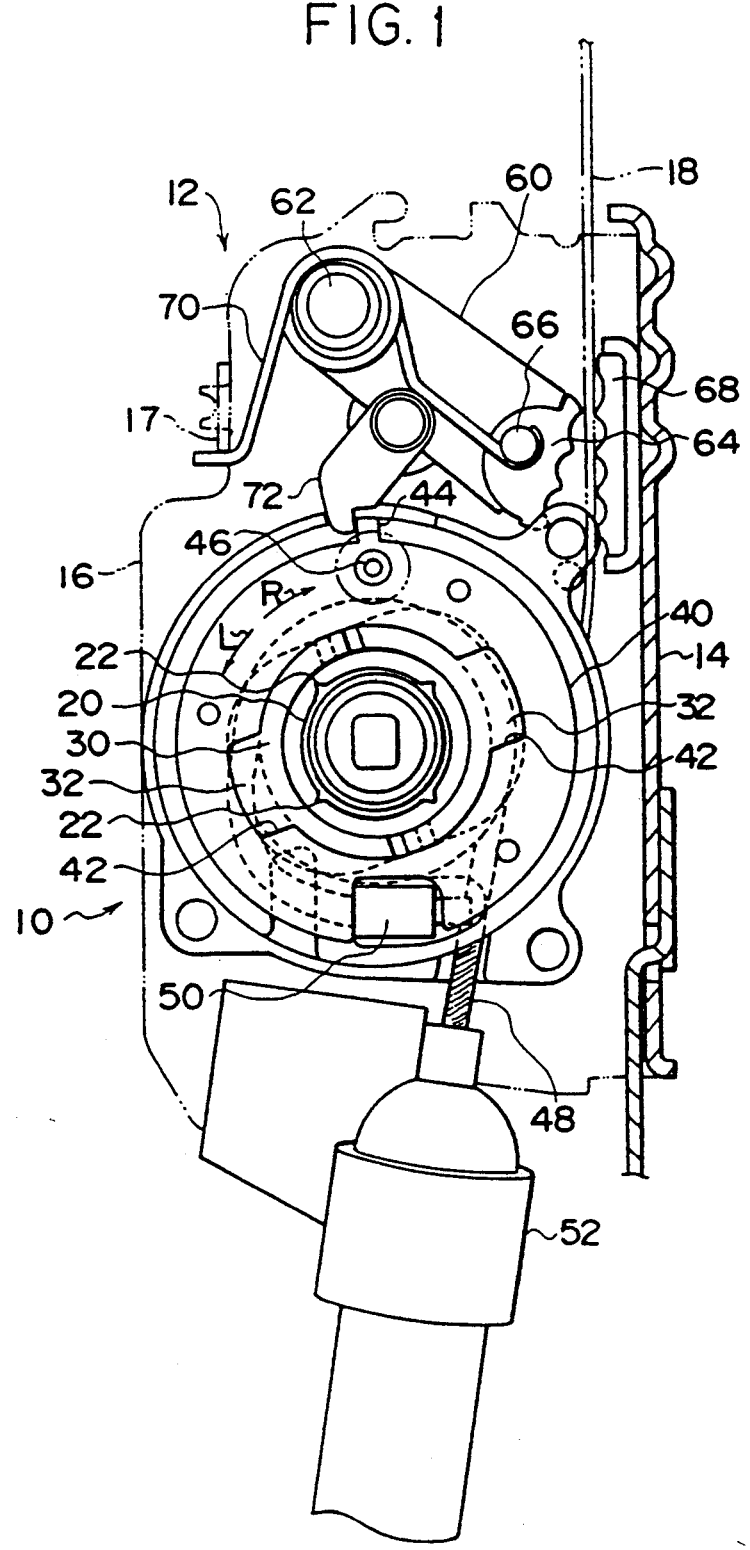
FIG. 1 is a cross-sectional view of a preloader in accordance with a first embodiment of the present invention and a webbing retractor to which the preloader is applied.
Figure 2:
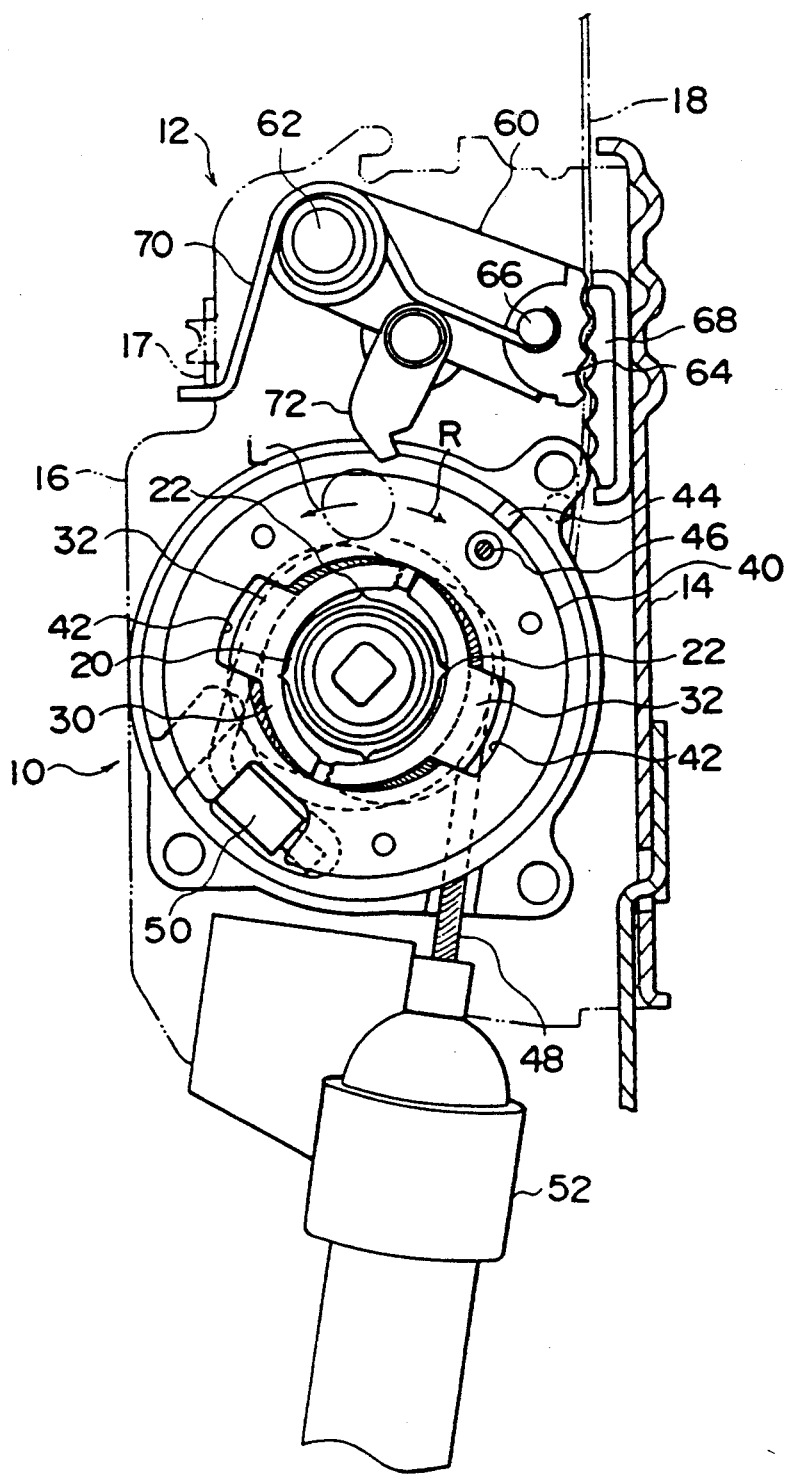
FIG. 2 is an operational view of FIG. 1.

FIGS. 1 and 2 show cross-sectional views of a preloader 10 in accordance with a first embodiment of the present invention and a webbing retractor 12 to which the preloader 10 is applied.

In the webbing retractor 12, an unillustrated takeup shaft is rotatably supported between a pair of opposing side plates 16 of a frame 14, and one end of a webbing 18 for restraining an occupant is taken up onto the takeup shaft in the form of a roll.

One end portion of the takeup shaft projects outwardly of the side plate 16 by a predetermined length, and an engaging shaft 20 is integrally coupled therewith. As a result, the engaging shaft 20 always rotates integrally with the takeup shaft. Pawls 22 are projectingly formed around an outer periphery of the engaging shaft 20 along an axis thereof. A rotating drum 30 is disposed radially outwardly of the engaging shaft 20.

The rotating drum 30 is formed in a substantially cylindrical configuration whose inside diameter is slightly larger than the outside diameter of the engaging shaft 20, and the engaging shaft 20 is freely rotatable in a state in which the inner peripheral surface of the rotating drum 30 does not abut against the pawls 22 of the engaging shaft 20. This rotating drum 30 is formed of a flexible member, and a portion of the outer periphery thereof is notched in an axial direction so as to facilitate the deformation of the rotating drum 30. In addition, a pair of arms 32 are formed at an axial end of the rotating drum 30 in such a manner as to extend radially outwardly therefrom and are fitted in fitting holes 42 formed in a plate 40, respectively. Consequently, the rotating drum 30 is capable of rotating the plate 40 integrally therewith.

The plate 40 has a disk-like configuration, and a projection 44 constituting a trigger means is formed on a portion of the outer periphery of the plate 40 in such a manner as to project radially outwardly therefrom. This plate 40 is held by the side plate 16 by means of a shear pin 46, with the result that the rotating drum 30 is also held in position. The shear pin 46 is adapted to be sheared when a predetermined shearing force is applied thereto.

In addition, one end of a wire 48 constituting a part of an actuating means is secured to the plate 40 via a piece 50, and an intermediate portion of the wire 48 is wound around the outer periphery of the rotating drum 30 in a webbing-taking up direction (in the direction of arrow R in FIG. 1). As a result, when the wire 48 is pulled, the intermediate portion of the wire 48 wound around the rotating drum 30 is tightly wound, and a torque acting in the webbing-taking-up direction occurs in the rotating drum 30 and the plate 40.

A force whereby the rotating drum 30 is deformed (a deforming force) is set to be smaller than a force whereby the shear pin 46 is sheared (a shearing force), so that when the intermediate portion of the wire 48 is tightly wound, the rotating drum 30 is first collapsed by the tightly winding force and is hence deformed toward the axis.

Meanwhile, the other end of the wire 48 is coupled with a piston of a cylinder 52 constituting another part of the actuating means. The cylinder 52 is provided with a gas generator, and the arrangement provided is such that when an unillustrated acceleration sensor detects the state of a sudden deceleration of the vehicle, the gas generator generates a large amount of gas and injects it into the cylinder 52. As a result, the wire 48 is pulled under the pressure of the injected gas.

An unillustrated spiral spring is coupled with the engaging shaft 20 which is coupled integrally with the takeup shaft, so that the engaging shaft 20, i.e., the takeup shaft, is constantly urged in the webbing-taking-up direction (in the direction of arrow R in FIG. 1). Accordingly, as the takeup shaft (engaging shaft 20) is rotated in a drawing out direction (in the direction of arrow L in FIG. 1) against the urging force of the spiral spring, the webbing 18 can be drawn out.

A lock lever 60 serving as a clamp member is disposed immediately above the rotating drum 30. A support pin 62 projects from one end of the lock lever 60 and is swingably supported on the side plate 16. Meanwhile, a clamp block 64 having a substantially semicircular configuration is attached to a distal end of the lock lever 60 by means of a support pin 66.

The clamp block 64 opposes a longitudinally intermediate portion of the webbing 18 which is drawn out from the takeup shaft, and the surface of the clamp block 64 opposing the webbing 18 is formed in a corrugated manner. In addition, a lock base 68 is secured to the frame 14 opposing the clamp block 64. The surface of the lock base 68 opposing the webbing 18 (clamp block 64) is also formed in a corrugated manner in correspondence with the clamp block 64. Consequently, as the lock lever 60 swings about the support pin 62, the webbing 18 can be clamped by the clamp block 64 and the lock base 68.

A torsion coil spring 70 serving as an urging member is fitted over the support pin 62 of the lock lever 60, and one end of this torsion coil spring 70 is retained by a reinforcing member 17 of the side plate 16, while the other end thereof is retained by the support pin 66. For this reason, the lock lever 60 is constantly urged in a direction in which the clamp block 64 approaches the lock base 68, i.e., in the direction in which the webbing 18 is clamped.

An arm 72 constituting the trigger means is secured to an intermediate portion of the lock lever 60. A distal end portion of the arm 72 is engaged with the projection 44 formed on the plate 40, and is held in a state in which the clamp block 64 of the lock lever 60 is spaced apart from the lock base 68. That is, as the arm 72 is engaged with the projection 44, the lock lever 60 is held in a state in which it is spaced apart from the lock base 68, against the urging force of the torsion coil spring 70. The arrangement provided is such that when engagement between the arm 72 and the projection 44 is canceled, the clamp block 64 moves in the webbing-clamping direction by the urging force of the torsion coil spring 70.

The webbing retractor 12 having the above-described arrangement is also provided with an unillustrated lock mechanism for instantaneously preventing the rotation of the takeup shaft in the webbing-drawing-out direction upon being actuated by the acceleration sensor.

The operation of this embodiment will be described hereinafter.

In the normal state of the vehicle, since the inner peripheral surface of the rotating drum 30 is spaced apart from the pawls 22 of the engaging shaft 20, the engaging shaft 20, i.e., the takeup shaft, is capable of rotating either in the direction in which the webbing 18 is taken up or in the direction in which it is drawn out. Accordingly, since the webbing 18 is freely taken up or drawn out with respect to the takeup shaft by following changes in the occupant's posture, the occupant is not restrained.

However, when the vehicle reaches the state of a sudden deceleration (a state in which a large acceleration of, for instance, 10G or thereabouts has acted), the acceleration sensor detects the same, and the gas generator of the cylinder 52 is actuated. As a result, the wire 48 is pulled, and the intermediate portion of the wire 48 is tightly wound around the rotating drum 30. Here, since the deforming force of the rotating drum 30 is set to be smaller than the shearing force of the shear pin 46, the rotating drum 30 is first collapsed by the tightly winding force of the wire 48 and is thereby deformed toward the axis. Hence, the pawls 22 of the engaging shaft 20 bite into the inner peripheral surface of the rotating drum 30, and the rotating drum 30 and the engaging shaft 20 are made integral (in the state illustrated in FIG. 2). Furthermore, the rotating drum 30 and the engaging shaft 20 are rotated in the webbing-taking-up direction (in the direction of arrow R in FIG. 2) in the integral state, with the result that the takeup shaft is suddenly rotated in the taking-up direction so as to forcibly take up the webbing 18, thereby allowing the webbing 18 to be applied closely around the occupant.

At approximately the same time, the webbing 18 tends to be pulled out of the webbing retractor 12 by the inertial movement of the occupant, but the unillustrated lock mechanism for instantaneously preventing the rotation of the takeup shaft in the webbing-drawing-out direction is actuated, so that the takeup shaft is prevented from rotating in the webbing-drawing-out direction. As a result, the occupant is restrained reliably with the webbing 18 applied closely around him or her.

Furthermore, at approximately the same time, a torque acts in the plate 40 through the rotation of the rotating drum 30 and causes the shear pin 46 to be sheared, and the plate 40 rotates integrally with the rotating drum 30. As a result, the engagement between the arm 72 of the lock lever 60 and the projection 44 of the plate 40 is canceled. Hence, the lock lever 60 is moved in the webbing-clamping direction by the urging force of the torsion coil spring 70 and clamps the webbing 18 (in the state shown in FIG. 2). Consequently, the drawing out of the webbing 18 is prevented. Accordingly, the subsequent tight winding of the webbing 18 is prevented, and the occupant can be restrained reliably.

Thus, as the webbing 18 is forcibly pulled in the taking-up direction when the vehicle suddenly decelerates, the webbing 18 can be applied closely around the occupant, and the subsequent tight winding of the webbing 18 can be prevented, thereby reliably restraining the occupant.

A description will now be given of other embodiments of the present invention. It should be noted that basically the same component parts as those of the first embodiment are denoted by the same reference numerals, and a description thereof will be omitted.

Figure 3:
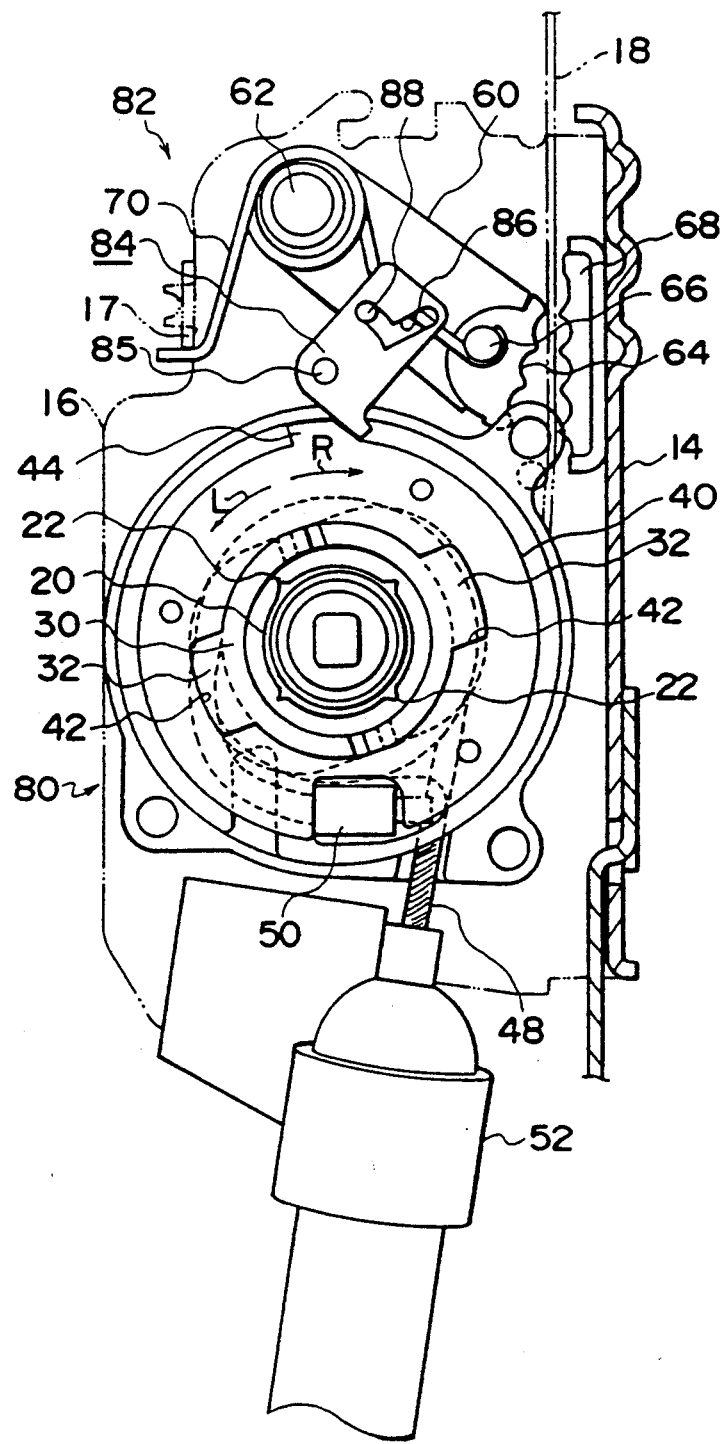
FIG. 3 is a cross-sectional view of a preloader in accordance with a second embodiment of the present invention and the webbing retractor to which the preloader is applied.
Figure 4:
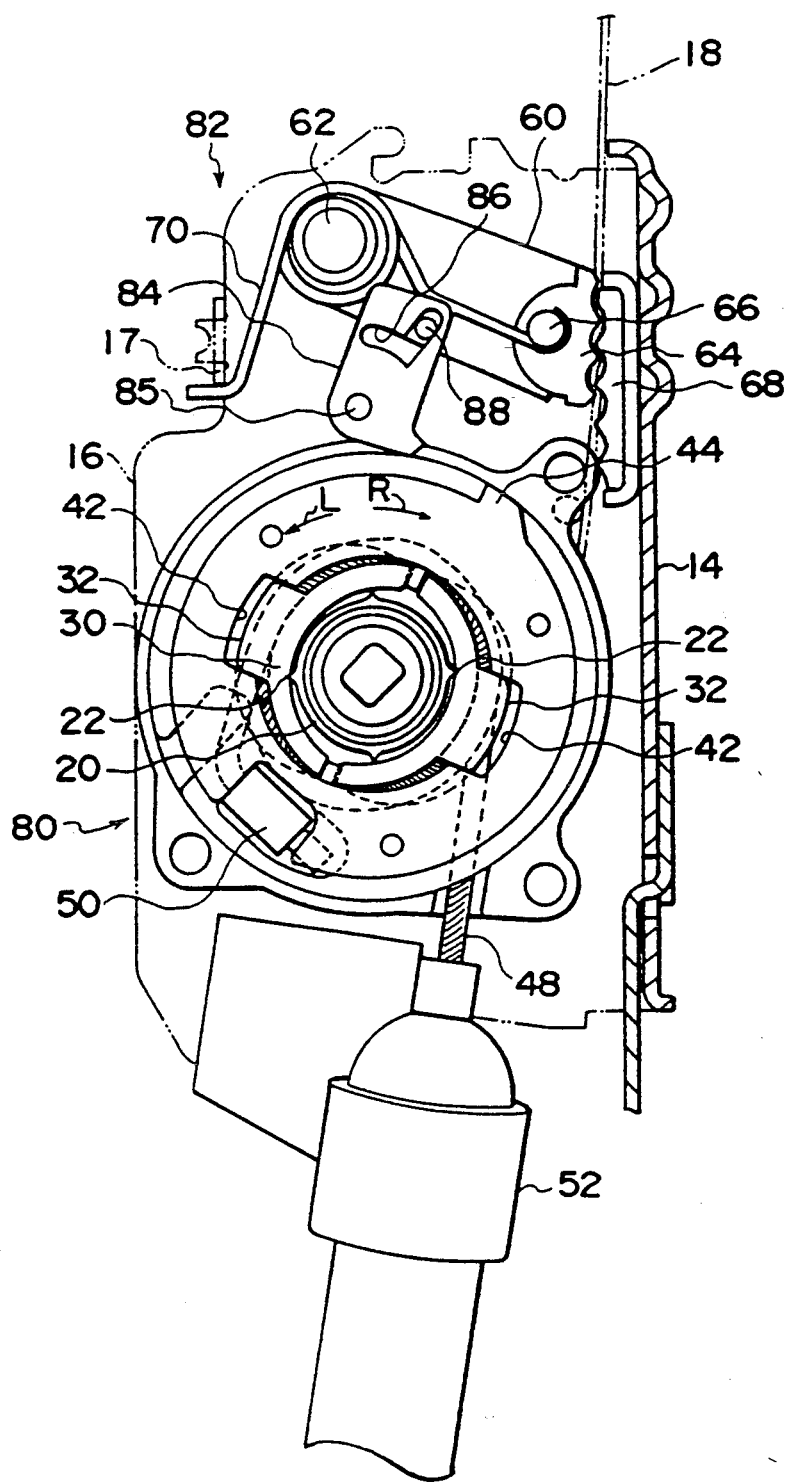
FIG. 4 is an operational view of FIG. 3.

FIGS. 3 and 4 show cross-sectional views of a preloader 80 in accordance with a second embodiment of the present invention and a webbing retractor 82 to which the preloader is applied.

In the webbing retractor 82, a cam 84 constituting the trigger means is disposed between the lock lever 60 and the plate 40. The cam 84 is rotatably supported by a support shaft 85, and its distal end is engaged with the projection 44 formed on the plate 40. Meanwhile, a substantially L-shaped holding hole 86 is provided in the cam 84 in the vicinity of another distal end thereof, and a pin 88 secured to the lock lever 60 is movably fitted therein.

The pin 88 is normally located at one end of the holding hole 86, with the result that the cam 84 holds the lock lever 60 against the urging force of the torsion coil spring 70 and sets the clamp block 64 in spaced-apart relationship with the lock base 68. Meanwhile, if the plate 40 is rotated, the cam 84 rotates about the support shaft 85 by being pressed by the projection 44, so that the pin 88 moves within the holding hole 86 toward the other end thereof. As a result, the holding of the lock lever 60 by the cam 84 is canceled, and the clamp block 64 is moved in the webbing-clamping direction by the urging force of the torsion coil spring 70.

With this webbing retractor 82 as well, when the vehicle reaches the state of a sudden deceleration, the rotating drum 30 is rotated in the webbing-taking-up direction integrally with the engaging shaft 20. As a result, the webbing 18 is forcibly taken up, thereby allowing the webbing 18 to be applied closely around the occupant.

At approximately the same time, the plate 40 rotates in conjunction with the rotation of the rotating drum 30, with the result that the projection 44 presses the cam 84. Consequently, the cam 84 rotates about the support shaft 85, which in turn causes the pin to move to the other end of the holding hole 86, thereby canceling the holding of the lock lever 60 by the cam 84. Hence, the lock lever 60 is moved in the webbing-clamping direction by the urging force of the torsion coil spring 70, thereby clamping the webbing 18 (in the state shown in FIG. 4). Accordingly, the drawing out of the webbing 18 is prevented, and the subsequent tight winding of the webbing 18 is prevented, so that the occupant can be restrained reliably.

Thus, with the webbing retractor 82 as well, as the webbing 18 is forcibly pulled in the taking-up direction when the vehicle suddenly decelerates, the webbing 18 is applied closely around the occupant, and the subsequent tight winding of the webbing 18 is prevented, so that the occupant is restrained reliably.

Figure 5:
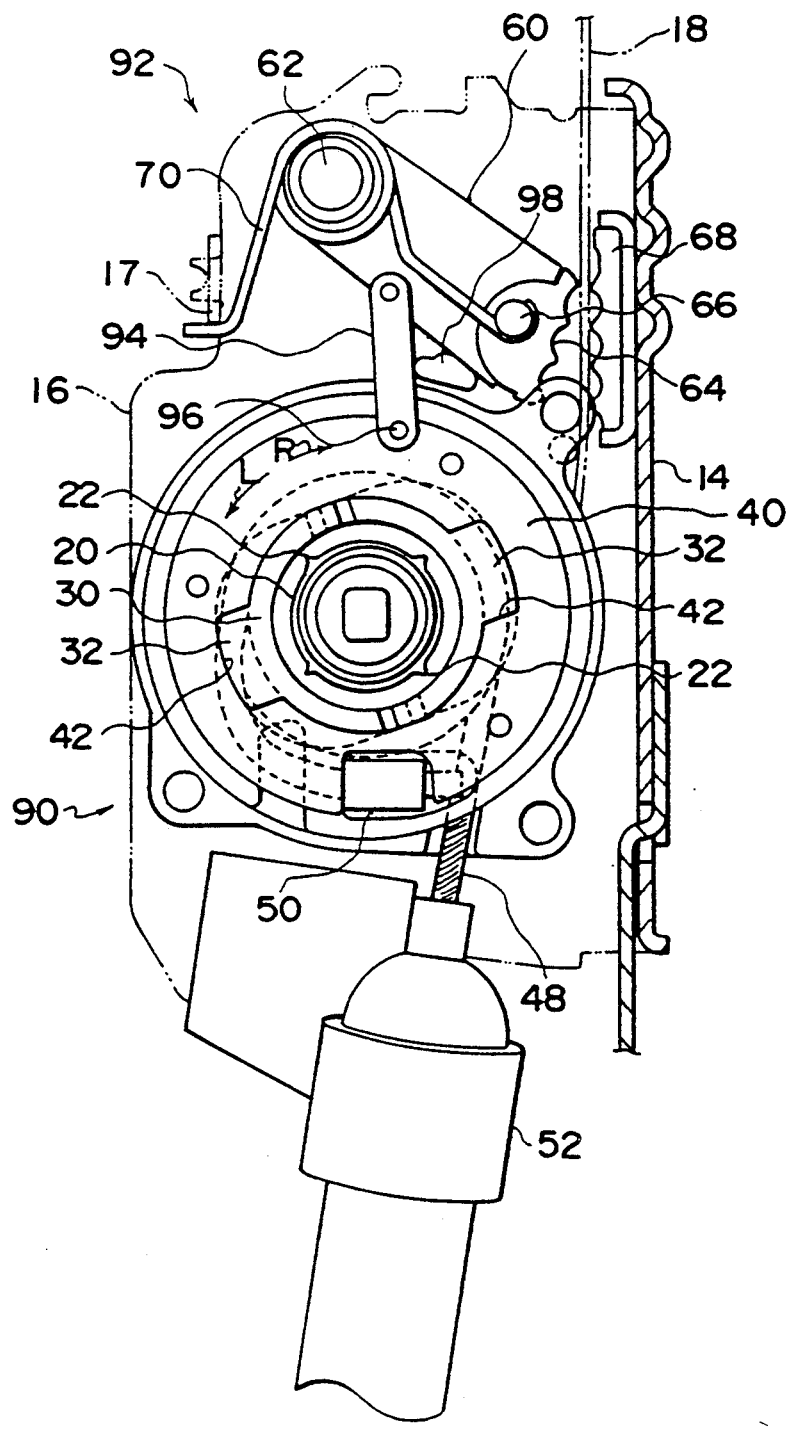
FIG. 5 is a cross-sectional view of a preloader in accordance with a third embodiment of the present invention and the webbing retractor to which the preloader is applied.
Figure 6:
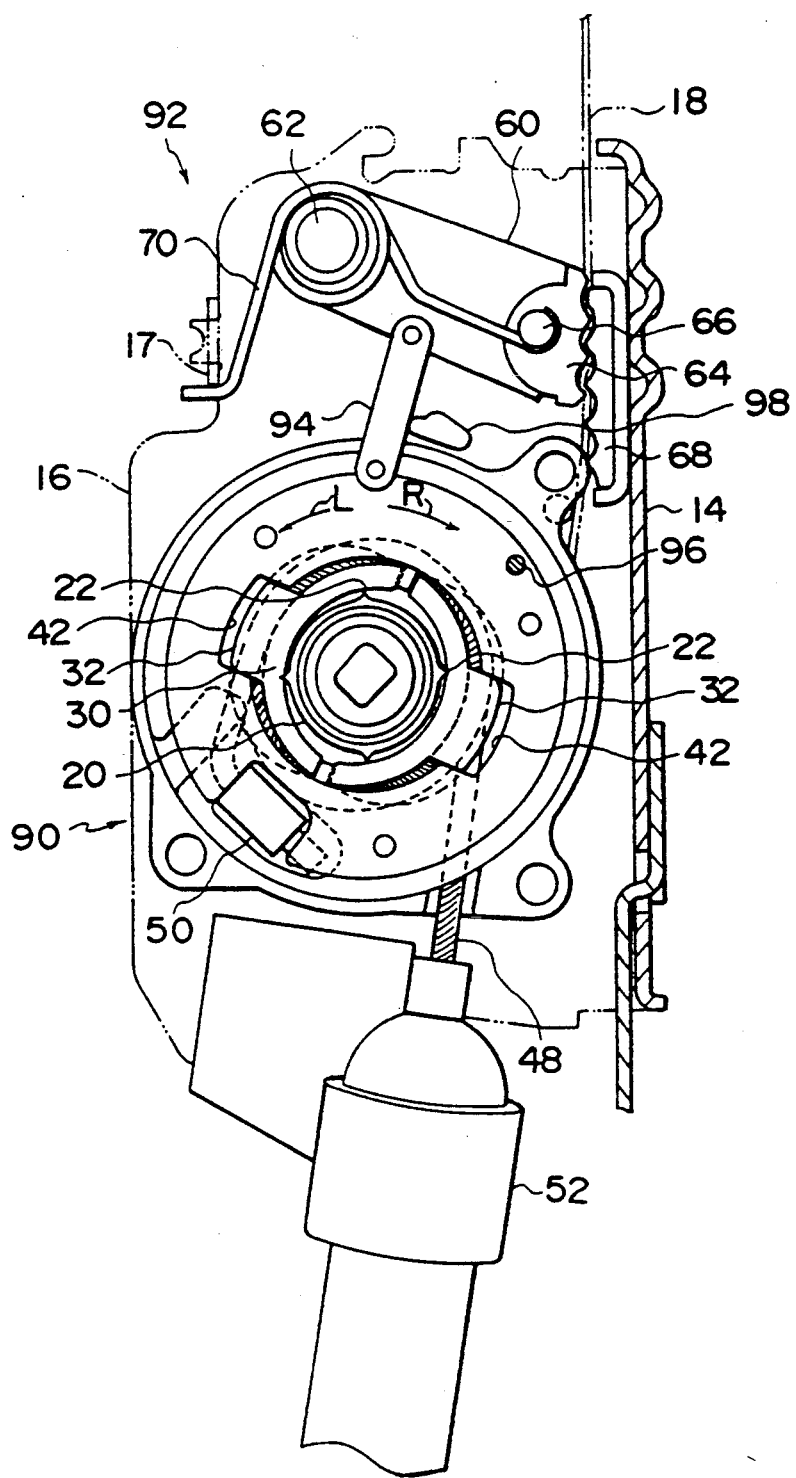
FIG. 6 is an operational view of FIG. 5.

FIGS. 5 and 6 show cross-sectional views of a preloader 90 in accordance with a third embodiment of the present invention and a webbing retractor 92 to which the preloader is applied.

In the webbing retractor 92, one end of a link 94 constituting the trigger means is coupled with the lock lever 60. The other end of the link 94 is coupled with the plate 40 by means of a shear pin 96, and a stopper 98 for restricting the movement of the link 94 is disposed on a side of the link 94. The link 94 is normally held in a state in which the clamp block 64 of the lock lever 60 is spaced apart from the lock base 68. Meanwhile, when the plate 40 rotates, the shear pin 96 is sheared, thereby canceling the coupling between the plate 40 and the link 94.

With this webbing retractor 92 as well, when the vehicle reaches the state of a sudden deceleration, the rotating drum 30 is made integral with the engaging shaft 20 and is rotated in the webbing-taking-up direction. As a result, the webbing 18 is forcibly taken up, thereby allowing the webbing 18 to be applied closely around the occupant.

At approximately the same time, the plate 40 rotates in conjunction with the rotation of the rotating drum 30. Here, since the movement of the link 94 coupled with the plate 40 by means of the shear pin 96 is restricted by the stopper 98, the shear pin 96 is sheared as the plate 40 rotates. Consequently, the holding of the lock lever 60 by the link 94 is canceled, and the lock lever 60 is moved in the webbing-clamping direction by the urging force of the torsion coil spring 70, so as to clamp the webbing 18 (in the state shown in FIG. 6). Accordingly, the drawing out of the webbing 18 is prevented, and the subsequent tight winding of the webbing 18 is prevented, thereby allowing the occupant to be restrained reliably.

Thus, with the webbing retractor 92 as well, as the webbing 18 is forcibly pulled in the taking-up direction when the vehicle suddenly decelerates, the webbing 18 can be applied closely around the occupant, and the subsequent tight winding of the webbing 18 can be prevented, thereby reliably restraining the occupant.

Figure 7:
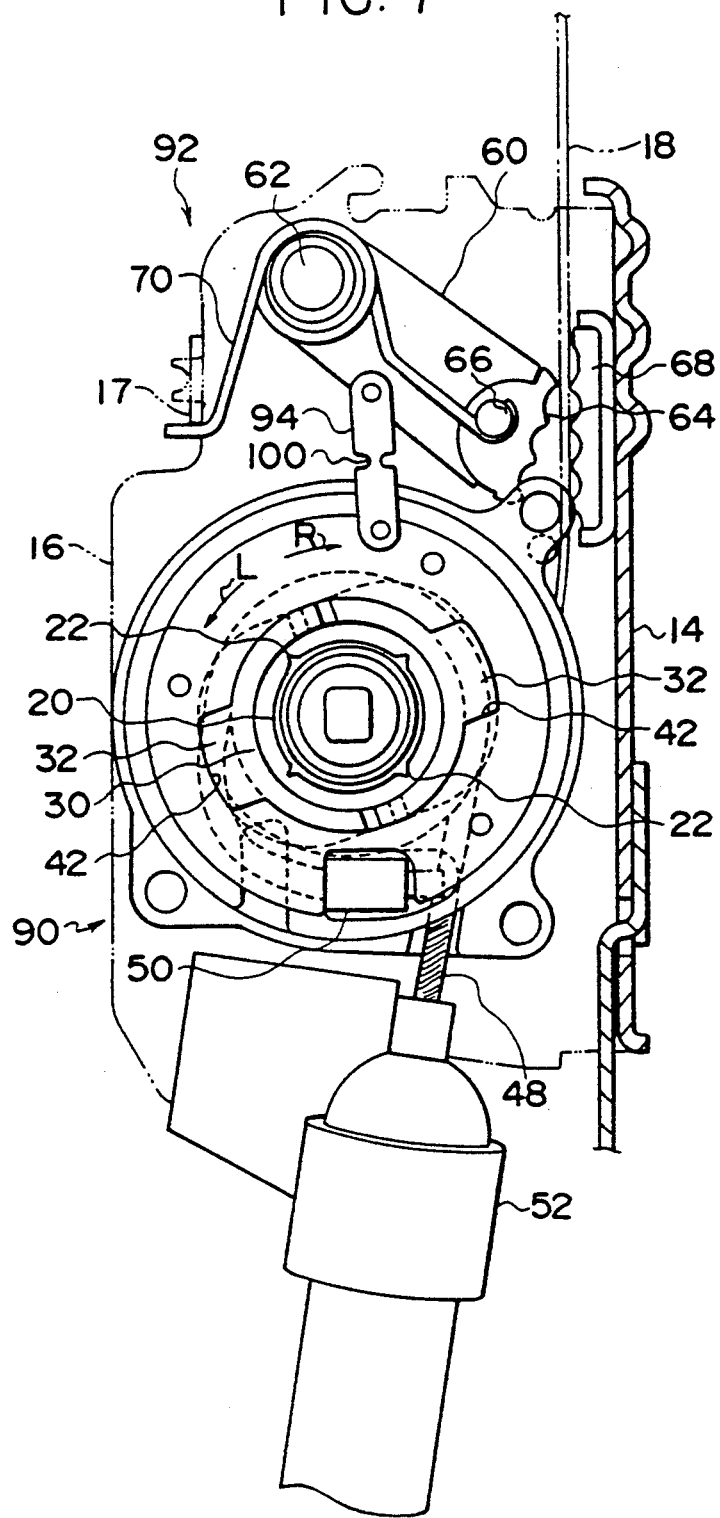
FIG. 7 is a cross-sectional view of the webbing retractor and illustrates another example of a link serving as a trigger means.

It should be noted that, although in the third embodiment, the link 94 is coupled with the plate 40 by means of the shear pin 96, and the shear pin 96 is adapted to be sheared, the invention is not restricted to the same, and, for instance, an arrangement may be alternatively provided such that, as shown in FIG. 7, an intermediate portion of the link 94 is formed with a small width so as to constitute a small-width portion 100 to be cut, and this small-width portion 100 is cut off as the plate 40 rotates. In this case as well, as the webbing 18 is forcibly pulled in the taking-up direction when the vehicle suddenly decelerates, the webbing 18 can be applied closely around the occupant, and the subsequent tight winding of the webbing 18 can be prevented.

Figure 8:
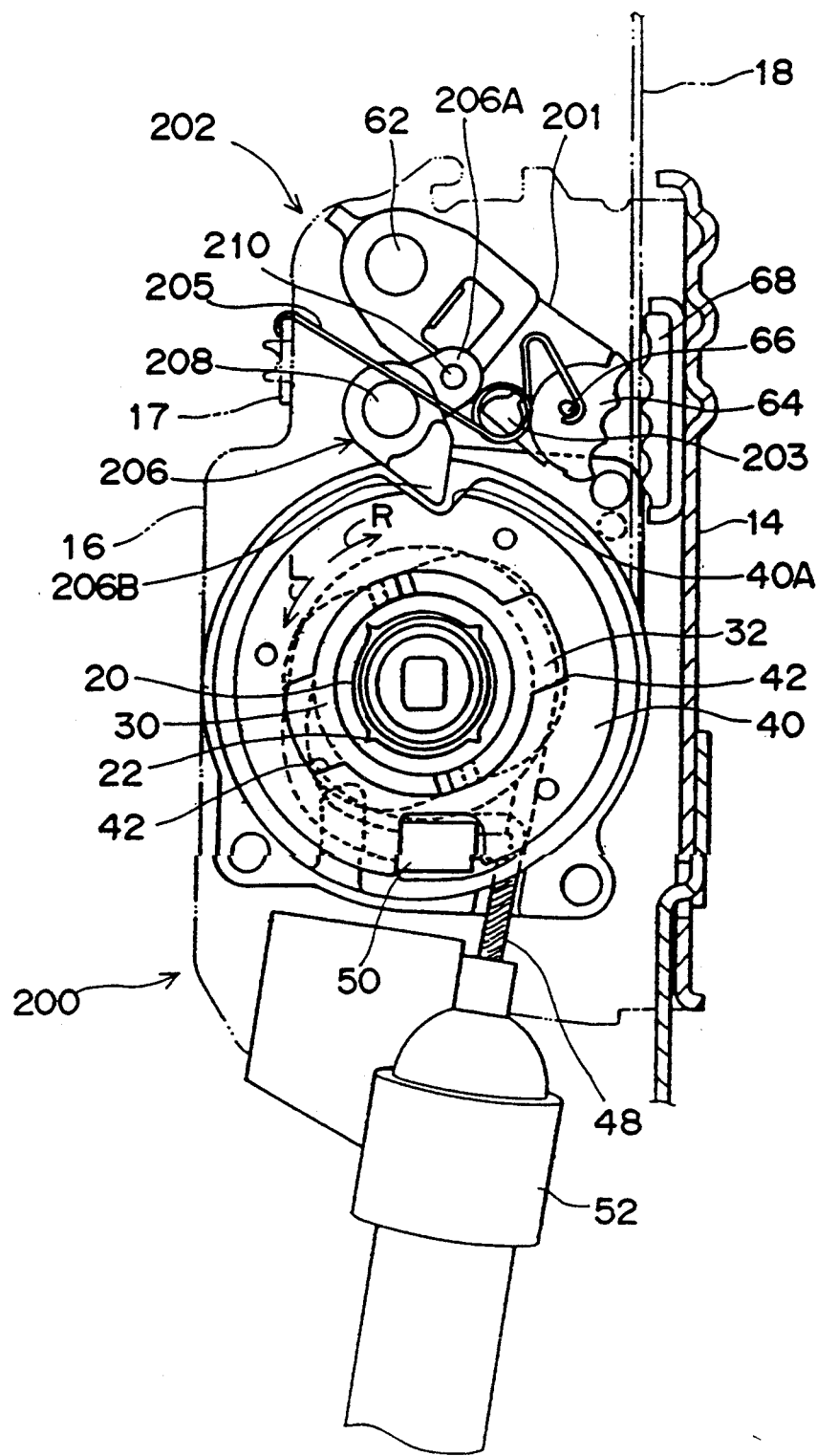
FIG. 8 is a cross-sectional view of a preloader in accordance with a fourth embodiment of the present invention and the webbing retractor to which the preloader is applied.
Figure 9:
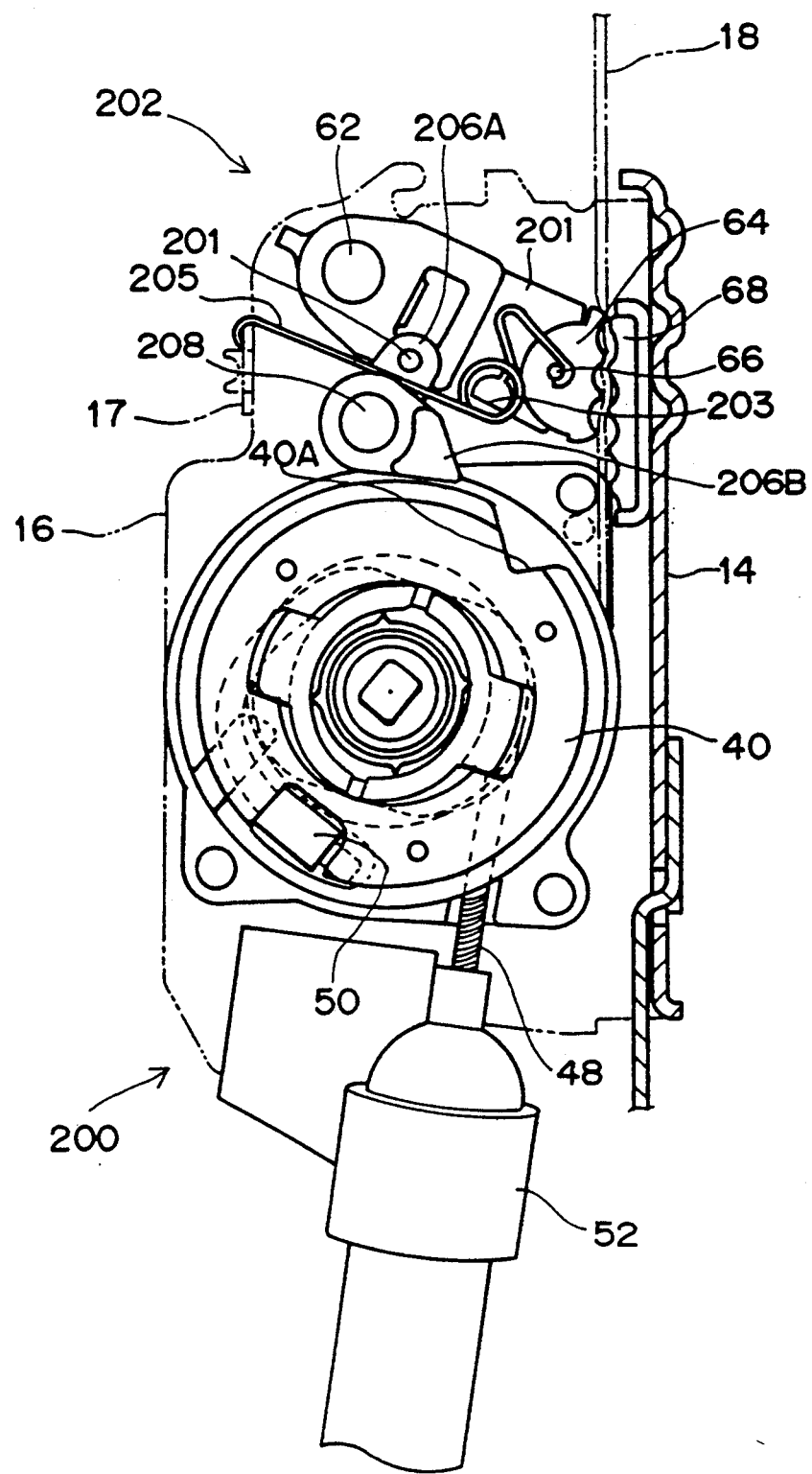
FIG. 9 is an operational view of FIG. 8.

FIGS. 8 and 9 show cross-sectional views of a preloader 200 in accordance with a fourth embodiment of the present invention and a webbing retractor 202 to which the preloader is applied.

A pin 203 is provided uprightly on a lock lever 201 in the vicinity of the clamp block 64, and a torsion coil spring 205 serving as an urging member is fitted over the pin 203. One end of the torsion coil spring 205 is retained by the reinforcing member 17 of the side plate 16, and the other end thereof is retained by the support pin 66. As a result, the lock lever 201 is constantly urged in the direction in which the clamp block 64 approaches the lock base 68, i.e., in the direction in which the clamp block 64 clamps the webbing 18.

A cam 206 constituting the trigger means is disposed between the lock lever 201 and the plate 40 in which a notched portion 40A is formed. The cam 206 is formed in a substantially L-shaped configuration. One end of a shear pin 210 is secured to an end portion 206A of the cam 206, while the other end of the shear pin 210 is secured to a portion of the lock lever 201 between the support pin 62 and the support pin 66. In addition, one end of a support shaft 208 is fixed to a bent portion of the cam 206, and the other end of the support shaft 208 is pivotally supported on the side wall 16. As a result, at normal times (at times other than those when the vehicle suddenly decelerates), the cam 206 holds the lock lever 201 against the urging force of the torsion coil spring 205 such that the clamp block 64 is spaced apart from the lock base 68.

The cam 206 is arranged such that, in this holding state, i.e., at normal times, another end portion 206B is located within the notched portion 40A in spaced-apart relationship with the wall surface of the notched portion 40A. When the plate 40 rotates in the direction of arrow R, the other end portion 206B is pressed by the wall surface of the notched portion 40A, and this pressing causes the shear pin 210 to be sheared.

With this webbing retractor 202 as well, when the vehicle reaches the state of a sudden deceleration, the rotating drum 30 is made integral with the engaging shaft 20 and is rotated in the webbing-taking-up direction. As a result, the webbing 18 is forcibly taken up, thereby allowing the webbing 18 to be applied closely around the occupant.

At approximately the same time, the plate 40 rotates in the direction of arrow R in conjunction with the rotation of the rotating drum 30, and the wall surface of the notched portion 40A presses the cam 206. As a result, a moment oriented counterclockwise in FIG. 8 acts on the one end 206A with the support shaft 208 as a center, so that a shearing force acts on the shear pin 210 and causes the shear pin 210 to be sheared, thereby allowing the holding of the lock lever 201 by the cam 206 to be canceled. For this reason, the lock lever 201 is moved in the webbing-clamping direction by the urging force of the torsion coil spring 205, and clamps the webbing 18 (in the state shown in FIG. 9). Accordingly, the drawing out of the webbing 18 is prevented, and the subsequent tight winding of the webbing 18 is prevented, thereby allowing the occupant to be restrained reliably.

With the webbing retractor 202 in accordance with this embodiment as well, as the webbing 18 is forcibly pulled in the taking-up direction when the vehicle suddenly decelerates, the webbing 18 can be applied closely around the occupant, and the subsequent tight winding of the webbing 18 can be prevented, thereby reliably restraining the occupant.

Furthermore, in this embodiment, the requirement for the dimensional accuracy of the cam 206 can be less stringent since the lock lever 201 can be held in a state in which the clamp block 64 is spaced apart from the lock base 68 by means of the cam 206 disposed in spaced-apart relationship with the plate 40, i.e., since the lock lever 201 can be held without any need to take into consideration the engagement between the plate 40 and the cam 206. For instance, even in a case where the plate 40 is attached with play, the cam 206 can be attached without being affected by the play. In addition, in this embodiment, since the cam 206 can be attached without being engaged with the plate 40, the efficiency with which the cam 206 is assembled is excellent.

Figure 10:
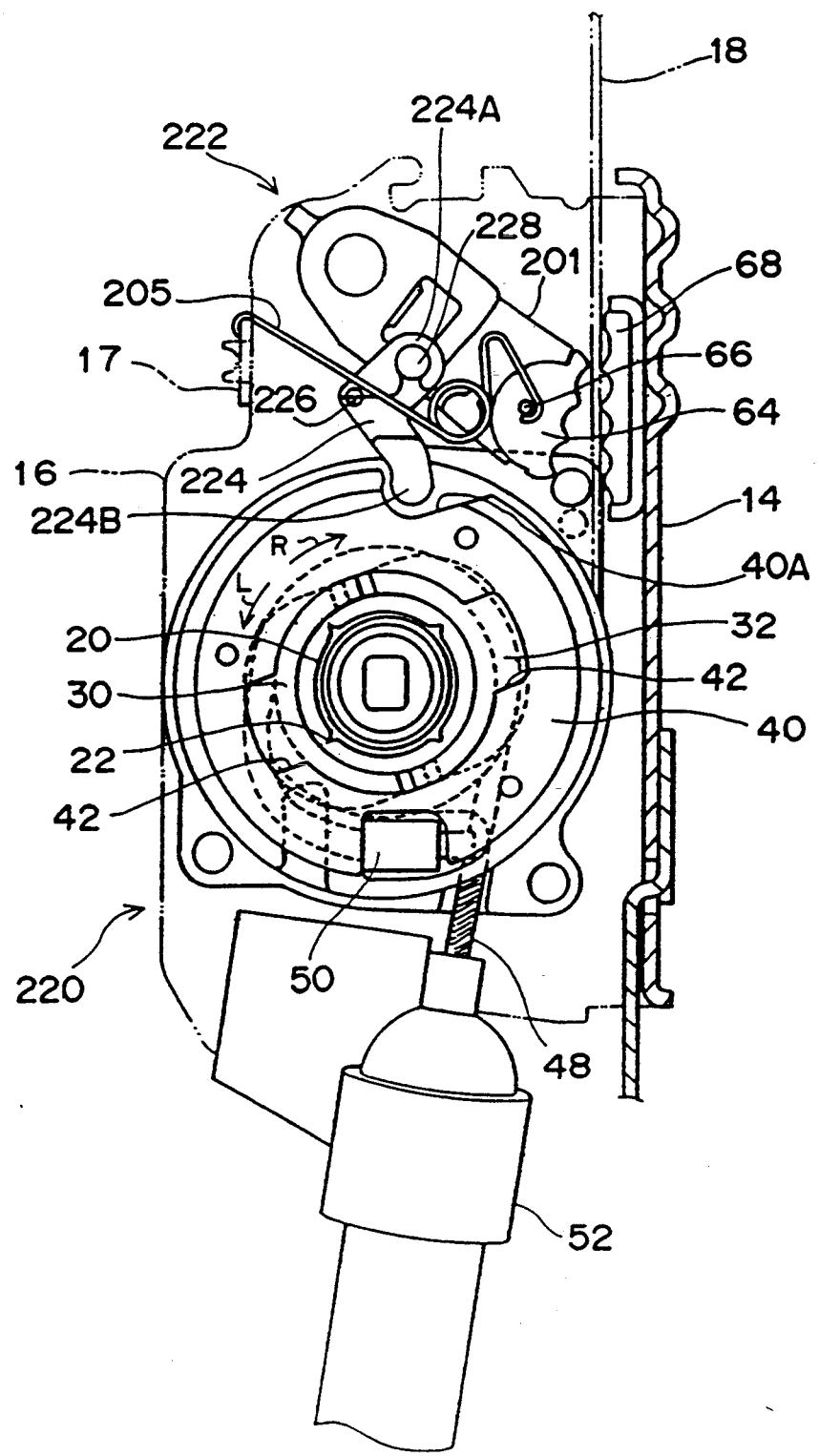
FIG. 10 is a cross-sectional view of a preloader in accordance with a fifth embodiment of the present invention and the webbing retractor to which the preloader is applied.
Figure 11:
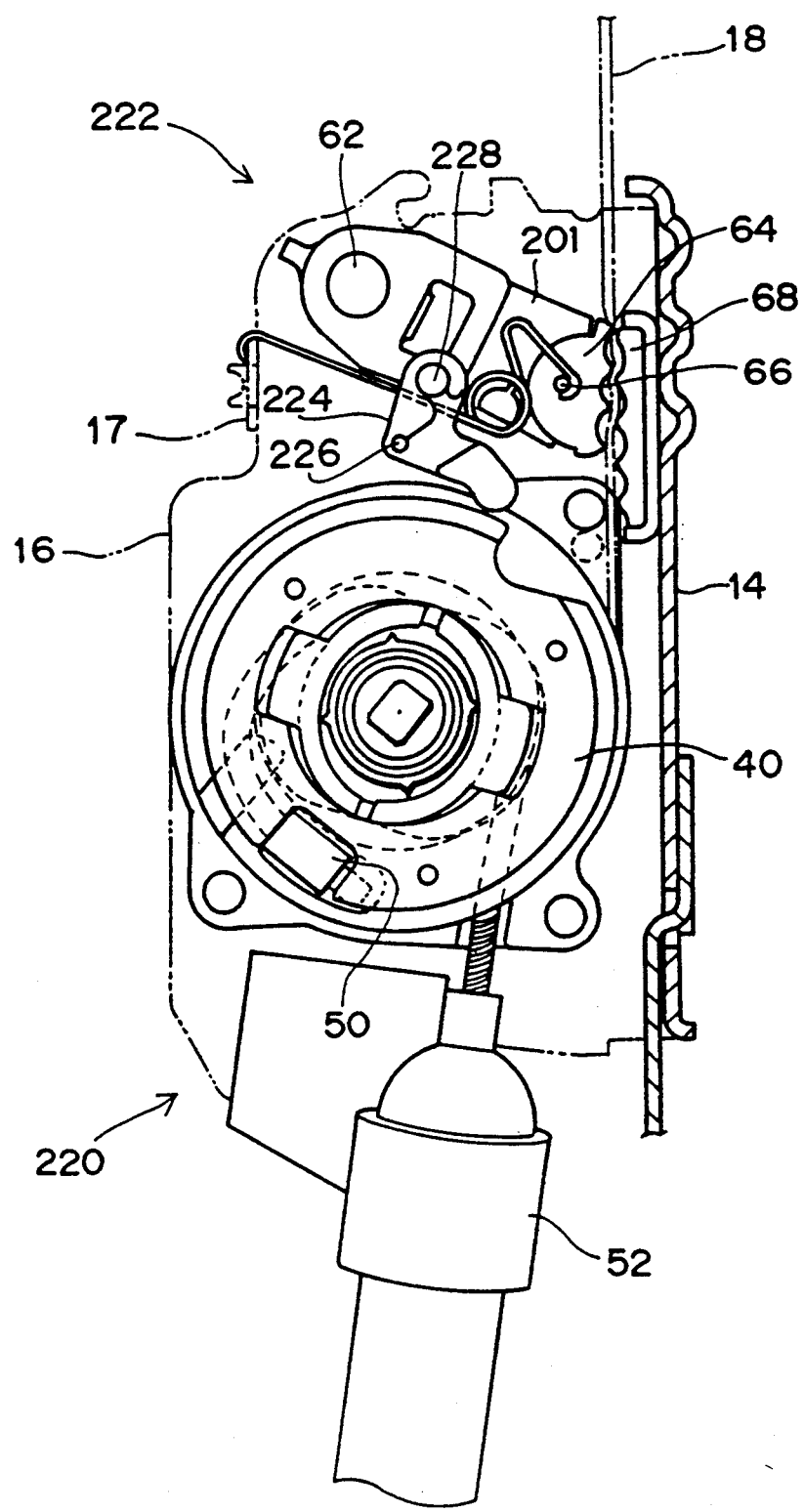
FIG. 11 is an operational view of FIG. 10.

FIGS. 10 and 11 show a preloader 220 in accordance with a fifth embodiment of the present invention and a webbing retractor 222 to which the preloader is applied. It should be noted that basically the same component parts as those of the fourth embodiment are denoted by the same reference numerals, and a description thereof will be omitted.

A cam 224 constituting the trigger means is disposed between the lock lever 201 and the plate 40 in which the notched portion 40A is formed. The cam 224 is formed in a substantially L-shaped configuration. A support shaft 228 having one end pivotally supported on the lock lever 201 has its other end secured to an end portion 224A of the cam 224. One end of a shear pin 226 is secured to a bent portion of the cam 224, while the other end of the shear pin 226 is secured to the side wall 16. As a result, at normal times the cam 224 holds the lock lever 201 against the urging force of the torsion coil spring 205 such that the clamp block 64 is spaced apart from the lock base 68.

The cam 224 is arranged such that, in this holding state, another end portion 224B is located within the notched portion 40A in spaced-apart relationship with the wall surface of the notched portion 40A. When the plate 40 rotates in the direction of arrow R, the other end portion 224B is pressed by the wall surface of the notched portion 40A, and this pressing causes the shear pin 226 to be sheared.

With this webbing retractor 222 as well, when the vehicle reaches the state of a sudden deceleration, the rotating drum 30 is made integral with the engaging shaft 20 and is rotated in the webbing-taking-up direction. As a result, the webbing 18 is forcibly taken up, thereby allowing the webbing 18 to be applied closely around the occupant.

At approximately the same time, the plate 40 rotates in conjunction with the rotation of the rotating drum 30, and the wall surface of the notched portion 40A presses the cam 224. As a result, the shear pin 226 is sheared, thereby allowing the holding of the lock lever 201 by the cam 224 to be canceled. For this reason, the lock lever 201 is moved in the webbing-clamping direction by the urging force of the torsion coil spring 205, and clamps the webbing 18 (in the state shown in FIG. 11). Accordingly, the drawing out of the webbing 18 is prevented, and the subsequent tight winding of the webbing 18 is prevented, thereby allowing the occupant to be restrained reliably.

With the webbing retractor 222 in accordance with this embodiment as well, as the webbing 18 is forcibly pulled in the taking-up direction when the vehicle suddenly decelerates, the webbing 18 can be applied closely around the occupant, and the subsequent tight winding of the webbing 18 can be prevented, thereby reliably restraining the occupant.

Furthermore, in this embodiment, in the same way as in the fourth embodiment, the requirement for the dimensional accuracy of the cam 224 can be less stringent, and the efficiency with which the cam 224 is assembled is excellent.

Figure 12:
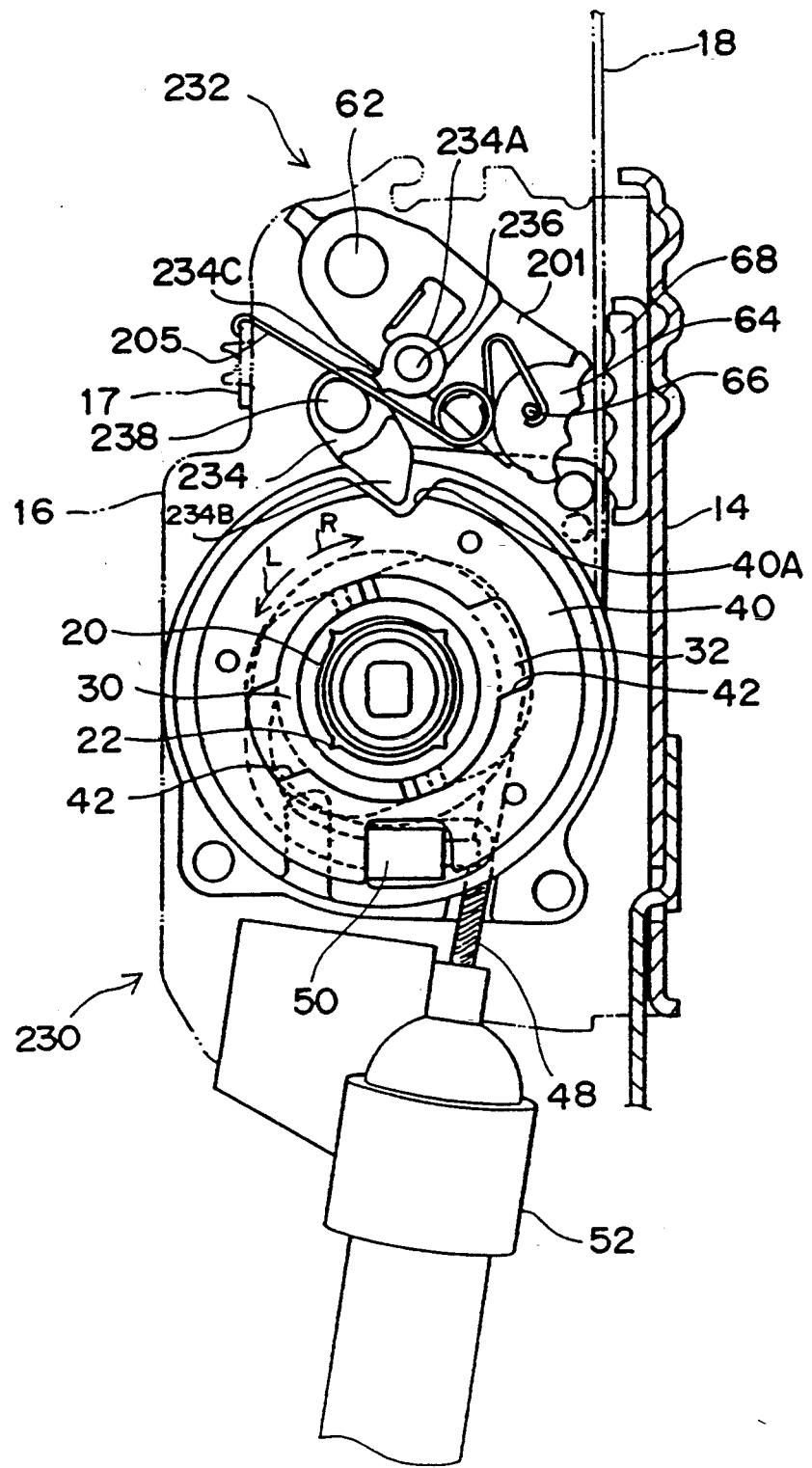
FIG. 12 is a cross-sectional view of a preloader in accordance with a sixth embodiment of the present invention and the webbing retractor to which the preloader is applied.
Figure 13:
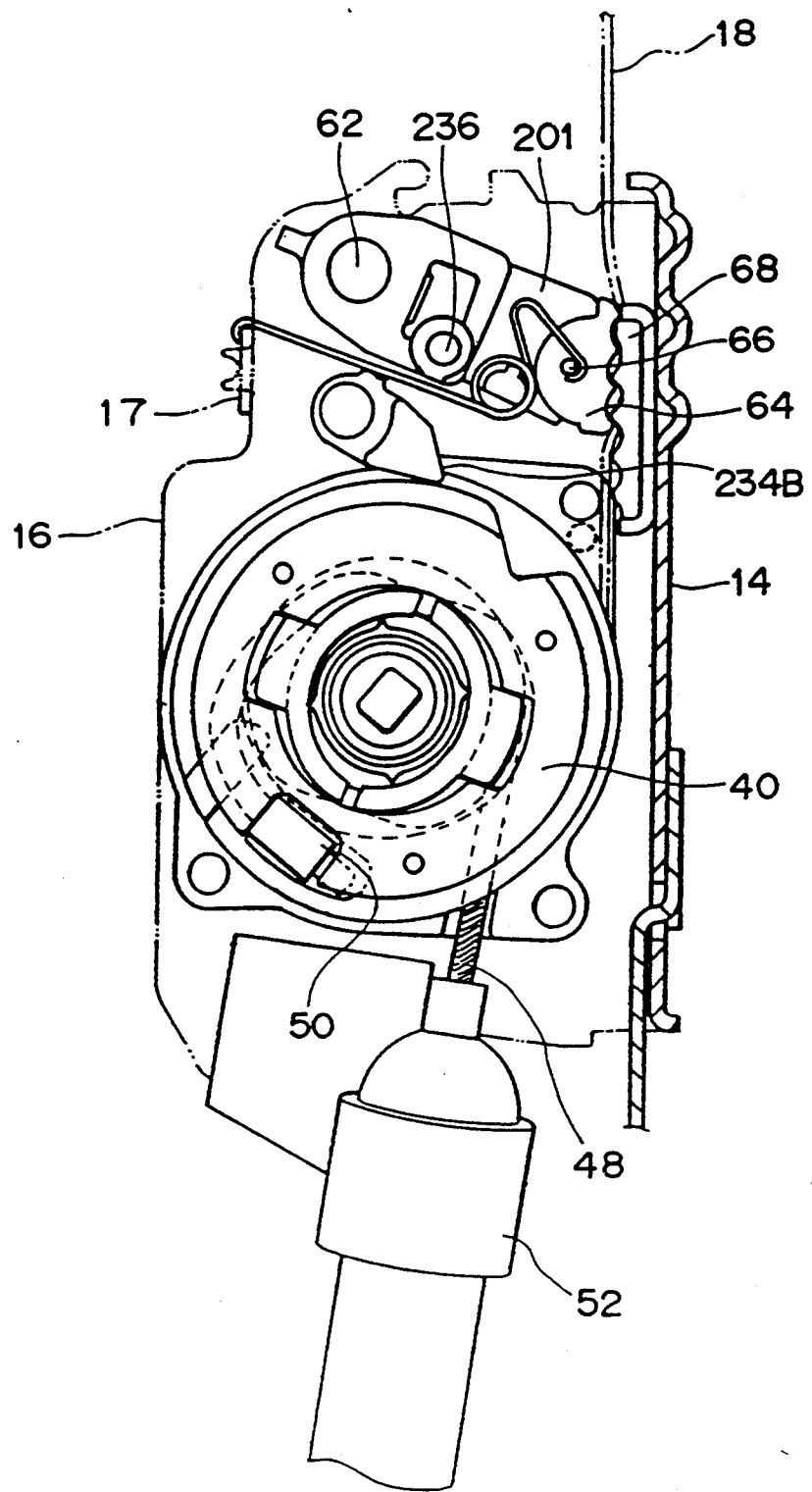
FIG. 13 is an operational view of FIG. 12.

FIGS. 12 and 13 show a preloader 230 in accordance with a sixth embodiment of the present invention and a webbing retractor 232 to which the preloader is applied. It should be noted that basically the same component parts as those of the fourth embodiment are denoted by the same reference numerals, and a description thereof will be omitted.

A cam 234 constituting the trigger means is disposed between the lock lever 201 and the plate 40 in which the notched portion 40A is formed. The cam 234 is formed in a substantially L-shaped configuration. One end of a support shaft 236 is secured to an end portion 234A of the cam 234, while the other end of the support shaft 236 is pivotally supported on the lock lever 201. In addition, one end of a support shaft 238 is secured to a bent portion of the cam 234, while the other end of the support shaft 238 is pivotally supported on the side wall 16. As a result, at normal times (at times other than those when the vehicle suddenly decelerates), the cam 234 holds the lock lever 201 against the urging force of the torsion coil spring 205 such that the clamp block 64 is spaced apart from the lock base 68.

Furthermore, a small-width portion 234C is formed between the bent portion and the end portion 234A of the cam 234, and the cam 234 is adapted to be easily sheared at the small-width portion 234C.

The cam 234 is arranged such that, in the aforementioned holding state, i.e., at normal times, another end portion 234B is located within the notched portion 40A in spaced-apart relationship with the wall surface of the notched portion 40A. When the plate 40 rotates in the direction of arrow R, the other end portion 234B is pressed by the wall surface of the notched portion 40A, and this pressing causes the small-width portion 234C to be broken.

With this webbing retractor 232 as well, when the vehicle reaches the state of a sudden deceleration, the rotating drum 30 is made integral with the engaging shaft 20 and is rotated in the webbing-taking-up direction. As a result, the webbing 18 is forcibly taken up, thereby allowing the webbing 18 to be applied closely around the occupant.

At approximately the same time, the plate 40 rotates in conjunction with the rotation of the rotating drum 30, and the wall surface of the notched portion 40A presses the cam 234. As a result, the small-width portion 234C is sheared, thereby allowing the holding of the lock lever 201 by the cam 234 to be canceled. For this reason, the lock lever 201 is moved in the webbing clamping direction by the urging force of the torsion coil spring 205, and clamps the webbing 18 (in the state shown in FIG. 13). Accordingly, the drawing out of the webbing 18 is prevented, and the subsequent tight winding of the webbing 18 is prevented, thereby allowing the occupant to be restrained reliably.

With the webbing retractor 232 in accordance with this embodiment as well, as the webbing 18 is forcibly pulled in the taking-up direction when the vehicle suddenly decelerates, the webbing 18 can be applied closely around the occupant, and the subsequent tight winding of the webbing 18 can be prevented, thereby reliably restraining the occupant.

Furthermore, in this embodiment, the requirement for the dimensional accuracy of the cam 234 can be less stringent, and the efficiency with which the cam 234 is assembled is excellent.

Since the above-described arrangement is provided, the preloader in accordance with the present invention offers an outstanding advantage in that, as the webbing is forcibly pulled in the taking-up direction when the vehicle suddenly decelerates, the webbing can be applied closely around the occupant, and the subsequent tight winding of the webbing can be prevented, thereby reliably restraining the occupant. In addition, the preloader in accordance with the present invention offers an outstanding advantage in that the requirement for the dimensional accuracy of the trigger means can be made less stringent.

What is claimed is:

1. A preloader for use in a webbing retractor for retracting an occupant-restraining webbing onto a webbing takeup shaft so as to allow the webbing to be applied to the occupant with appropriate tightness, comprising:

a frame by which said webbing takeup shaft is rotatably held;

an engaging shaft coupled with said webbing takeup shaft;

a clutch means disposed coaxially with said webbing takeup shaft and said engaging shaft in spaced-apart relationship with said engaging shaft for engaging said engaging shaft;

clamp means disposed in such a manner as to be movable in a direction in which said clamp means engages with webbing being drawn out of said webbing takeup shaft and in a position in which said clamp means is spaced apart from the webbing, said clamp means being adapted to prevent the drawing out of the webbing in an engaged state of said clamp means by clamping the webbing being drawn out of said webbing takeup shaft;

urging means for constantly urging said clamp means in a webbing-clamping direction;

trigger means operable by said clutch means and being disposed in such a manner as to extend between said clutch means and said clamp means for preventing the movement of said clamp means in the webbing-clamping direction when said vehicle does not suddenly decelerate, and for permitting movement of said clamp means in the webbing clamping direction when said clutch means engages with said engaging shaft; and driving means for causing said clutch means to deform and engage said engaging shaft and for rotating said webbing takeup shaft in a taking-up direction via said engaging shaft when the vehicle suddenly decelerates;

wherein one end of said trigger means is supported by said clamp means, another end of said trigger means abuts against said clutch means as said clutch means moves, and a substantially intermediate portion of said trigger means is supported by said frame so as to hold said clamp means at a position spaced apart from the webbing, and wherein said clutch means has a notched portion formed on an outer periphery thereof, a portion of said trigger means being disposed within said notched portion for abutting against said notched portion as said clutch means moves.

2. A preloader according to claim 1, wherein one of said substantially intermediate portion of said trigger means and said one end of said trigger means is pivotally supported by a shear pin so as to hold said clamp means at the position spaced apart from the webbing, and said shear pin is adapted to be broken when a predetermined load or greater is applied to said trigger means by the movement of said clutch means.

3. A preloader according to claim 1, wherein said trigger means is provided with a fragile portion at a substantially intermediate portion thereof, said fragile portion being broken when a predetermined load or greater is applied to said trigger means by the movement of said clutch means.

4. A preloader according to claim 1, wherein said clutch means is comprised of a rotatable drum and a plate, and said drum has a first portion which is capable of engaging with said engaging shaft and a second portion which is engaged with said plate, wherein said plate is rotated when said drum is rotated.

5. A preloader for use in a webbing retractor for retracting an occupant-restraining webbing onto a webbing takeup shaft so as to allow the webbing to be applied to the occupant with appropriate tightness, comprising:

a frame by which said webbing takeup shaft is rotatably held;

a rotatable drum disposed in spaced-apart relationship with said webbing takeup shaft for engaging said webbing takeup shaft;

a plate rotatably supported by said frame such that said rotatable drum is spaced apart from said webbing takeup shaft;

clamp means having an urging member for constantly urging said clamp means in a direction in which said clamp means clamps an intermediate portion of the webbing, said clamp means being disposed in a state in which said clamp means does not clamp the webbing being drawn out of said webbing takeup shaft, and said clamp means being adapted to prevent the drawing out of the webbing in a clamping state of said clamp means by clamping the intermediate portion of the webbing being drawn out of said webbing takeup shaft;

trigger means for permitting the movement of said clamp means in the webbing-clamping direction when said plate rotates; and driving means for causing said rotating drum to deform and engage said webbing takeup shaft when the vehicle suddenly decelerates by applying a radial load to said drum and for rotating said drum and said take-up shaft in a webbing-taking-up direction, and a shear pin operatively disposed between said trigger means and said clamp means, wherein said plate is rotated when said drum rotates and said shear pin is broken when a predetermined load or greater is applied to said shear pin by said drum via said plate.

6. A preloader for use in a webbing retractor for retracting an occupant-restraining webbing onto a webbing takeup shaft so as to allow the webbing to be applied to the occupant with appropriate tightness, comprising:

a frame by which said webbing takeup shaft is rotatably held;

an engaging shaft coupled with said webbing takeup shaft;

a rotatable drum disposed in spaced-apart relationship with said engaging shaft in such a manner as to be capable of engaging said engaging shaft;

a plate rotatably supported by said frame such that said rotating drum is spaced apart from said engaging shaft;

clamp means having an urging member for constantly urging said clamp means in a webbing-clamping direction, said clamp means being disposed in such a manner as to be capable of clamping the webbing being drawn out of said webbing takeup shaft, and said clamp means being adapted to prevent the drawing out of the webbing in the clamping state of said clamp means by clamping the webbing being drawn out of said webbing takeup shaft;

trigger means arranged such that one end thereof is supported by said clamp means, another end thereof abuts against said plate as said plate rotates, and a substantially intermediate portion thereof is supported by said frame, wherein said trigger means permits the movement of said clamp means in the webbing-clamping direction when the vehicle suddenly decelerates; and a wire member for causing said drum to deform and engage said engaging shaft by applying a radial load to said drum and for rotating said drum and webbing takeup shaft via said engaging shaft in the webbing-taking-up direction when the vehicle suddenly decelerates, and a shear pin operatively disposed between said trigger means and said clamp means, wherein said plate is rotated when said drum rotates and said shear pin is broken when a predetermined load or greater is applied to said shear pin by said drum via said plate.

* * * * *